United States Patent [19]

Sturgis

[11] Patent Number: 4,696,326

[45] Date of Patent: Sep. 29, 1987

[54] ANTI-MISMATCH SYSTEM

[76] Inventor: James L. Sturgis, 11860 W. 91st St., Overland Park, Kans. 66214

[21] Appl. No.: 870,929

[22] Filed: Jun. 5, 1986

[51] Int. Cl.$^4$ .............................................. F16L 37/28
[52] U.S. Cl. .............................. 137/614.04; 251/149.6; 285/18
[58] Field of Search ...................... 137/614.04, 619.06; 251/199.6; 285/12, 18

[56] References Cited

U.S. PATENT DOCUMENTS

| | | | |
|---|---|---|---|
| 3,108,825 | 10/1963 | MacDonald, Jr. | 285/18 |
| 3,170,667 | 2/1965 | Szohatzby | 251/149.6 |
| 3,448,760 | 6/1969 | Cranage | 251/149.6 X |
| 3,567,175 | 3/1971 | Scuito, Jr. | 251/149.6 |
| 3,592,231 | 7/1971 | Lamb | 251/149.6 X |
| 4,527,587 | 7/1985 | Fairlamb | 137/329.3 |
| 4,562,856 | 1/1986 | Garvey et al. | 137/614.2 X |

Primary Examiner—Martin P. Schwadron
Assistant Examiner—John C. Fox
Attorney, Agent, or Firm—Senniger, Powers, Leavitt and Roedel

[57] ABSTRACT

For use in connecting a plurality of pairs of fluid conduits wherein each pair comprises matching first and second conduits, an anti-mismatch system for preventing the inadvertent connection of mismatched fluid conduits. The anti-mismatch system comprises a plurality of sets of anti-mismatch fittings, each set including a first anti-mismatch fitting adapted for detachable connection to the first fluid conduit of each of the pairs of matching fluid conduits and a second anti-mismatch fitting adapted for detachable connection to the second fluid conduit of each of the pairs of matching fluid conduits. The first and second anti-mismatch fittings of each set are uniquely configured for interengagement only with one another and not with anti-mismatch fittings of different sets thereby to enable connection only of matching first and second fluid conduits.

16 Claims, 5 Drawing Figures

ANTI-MISMATCH SYSTEM

BACKGROUND OF THE INVENTION

This invention relates generally to fittings for fluid conduits, and more particularly to an anti-mismatch system which ensures the proper connection of matching fluid conduits and eliminates the possibility of inadvertently connecting mismatching fluid conduits.

The anti-mismatch system of the present invention has particular (albeit not exclusive) application in the beverage dispensing field. It will be noted in this regard that a variety of beverage syrups may be available at a beverage dispensing site. These syrups are usually transferred from large supply tanks to smaller holding tanks at the dispensing site. To effect such transfer, conventional coupling members are typically used to connect the fluid conduits (or flow lines). However, because the coupling members are interchangeably connectable, there is nothing to prevent the inadvertent misconnection of, for example, a supply tank containing a cola syrup to a holding tank for root beer syrup. This problem is aggravated by an inability to easily determine which holding tank line should be connected to any specific supply tank line. Additionally, during the coupling process, turning the coupling members relative to one another may cause the fluid conduits (e.g., hoses) to become twisted, tangled or kinked. Since some coupling members are unable to rotate relative to one another once they are connected, the fluid conduits remain twisted (i.e., they do not unwind) after connection, which unduly stresses the conduits.

One approach to solving the misconnection problem is incorporated in a system manufactured and sold by Hansen Manufacturing of Cleveland, Ohio. In this system two different types of anti-mismatch fittings are provided. The first type is used for a beverage syrup sold by one company and the second for other beverage syrups sold by other companies. This system prevents the inadvertent connection of fluid conduits carrying the beverage syrup of the one manufacturer with fluid conduits carrying the beverage syrups of the other manufacturers, but it does not prevent the inadvertent connection of mismatched fluid conduits carrying beverage syrups of the other manufacturers. Moreover, the anti-mismatch fittings of this system are not field-removable from their respective conduits, which prevents fittings of one type from being removed in the field and replaced by fittings of the other type in the event of a change from the syrup of the one manufacturer to a syrup of one of the other manufacturers, or vice versa. Also, replacement of an anti-mismatch pair of fittings is expensive, since parts of the fittings performing the anti-mismatch function are integral to the entire fitting, thereby necessitating the replacement of parts which would not otherwise have to be replaced.

While modifying a holding tank or supply tank to contain the syrup of one manufacturer for that of another may occasionally be desirable, it frequently becomes necessary to change the beverage contained in any supply or holding tank to another beverage of the same manufacturer. For example, when a manufacturer introduces a new beverage, it may become necessary to intentionally field-change a holding tank from holding a less popular old beverage to the new beverage. In some cases, an old beverage may still be popular in certain regions or with certain groups, and the new beverage may be popular in other regions or with other groups. It would then be desirable to change only a portion of the holding tanks to the new beverage so as to "target" each group with the appropriate product.

SUMMARY OF THE INVENTION

Among the several objects of the invention may be noted the provision of an anti-mismatch system which ensures proper connection of matching fluid conduits and which makes the connection of two mismatching conduits impossible; the provision of such a system which permits quick and easy field-alteration of two mismatching fluid conduits into matching fluid conduits, and which permits such alteration without disturbing fluid valving in the conduits and without leakage of fluid from the conduits; the provision of such a system wherein the components performing the anti-mismatch function are separate from other components of the system to facilitate replacement of the anti-mismatch components and to minimize the costs associated therewith; the provision of such an anti-mismatch system having components which are easy to disassemble and easy to clean; and the provision of such a system wherein the components of the system are durable, easy to connect and deliberately disconnect, not prone to accidental disconnection, and capable of rotation relative to each other after they are connected to relieve any torsional stress in the fluid conduits.

Generally, an anti-mismatch system of the present invention is used for connecting a plurality of pairs of fluid conduits wherein each pair comprises matching first and second conduits, and for preventing the inadvertent connection of mismatched fluid conduits. The anti-mismatch system comprises a plurality of sets of anti-mismatch fittings, each set including a first anti-mismatch fitting adapted for detachable connection to the first fluid conduit of each of the pairs of matching fluid conduits and a second anti-mismatch fitting adapted for detachable connection to the second fluid conduit of each of the pairs of matching fluid conduits. The first and second anti-mismatch fittings of each set are uniquely configured for interengagement only with one another and not with anti-mismatch fittings of different sets thereby to enable connection only of matching first and second fluid conduits.

In a second aspect of this invention, a plurality of pairs of fluid conduits is provided in combination with the anti-mismatch system for preventing the inadvertent connection of mismatched fluid conduits. Each pair of fluid conduits comprises matching first and second conduits. Each conduit has a fluid flow passage therethrough and a valve member movable in the passage between open and closed positions. The anti-mismatch system comprises a plurality of sets of anti-mismatch fittings. Each set of anti-mismatch fittings includes a first anti-mismatch fitting adapted for detachable connection to the first fluid conduit of each pair of matching fluid conduits and a second anti-mismatch fitting adapted for detachable connection to the second fluid conduit of each pair of matching fluid conduits. The first and second anti-mismatch fittings of each set are uniquely configured for interengagement only with one another and not with anti-mismatch fittings of different sets thereby to enable connection only of matching first and second fluid conduits. Means is provided for detachably connecting the matching first and second fluid conduits of each set. The valve members of matching conduits are movable to their open positions when the conduits are connected and to their closed positions when the conduits are disconnected. In addition, the valve members of each pair of matching conduits are further adapted to remain closed to block the flow of fluid through their respective fluid flow passages when the conduits are disconnected and the anti-mismatch fittings are detached from matching conduits.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
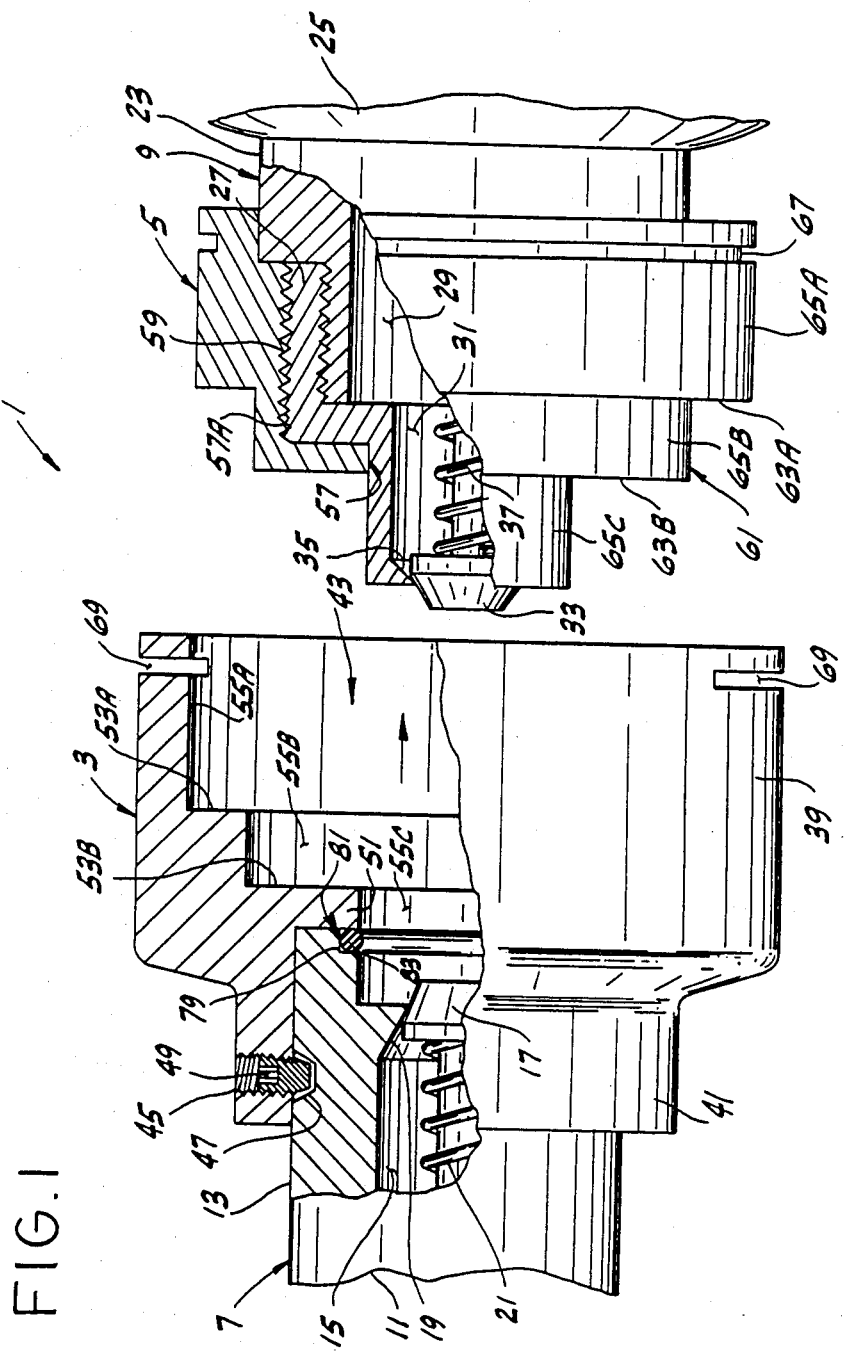
FIG. 1 is an enlarged exploded view of an anti-mismatch system of the present invention showing one set of coupling members, portions of the coupling members being broken away to illustrate details.

An anti-mismatch system of the present invention is particularly adapted for use in connecting a plurality of pairs of fluid conduits wherein each pair of conduits comprises two matching conduits. As used herein, "matching" fluid conduits means fluid conduits intended to be connected to one another, such as two conduits carrying a specific type of fluid (e.g., beverage syrup).

Referring now to the drawings, an anti-mismatch system of this invention comprises a plurality of sets of anti-mismatch fittings, one such set being designated in its entirety by the reference numeral 1. As shown, each set comprises a first (outer) anti-mismatch fitting generally designated 3 and a second (inner) anti-mismatch fitting generally designated 5 connected to matching first and second fluid conduits generally indicated at 7 and 9, respectively, the direction of fluid flow being from left to right as viewed in the drawings.

Figure 2:
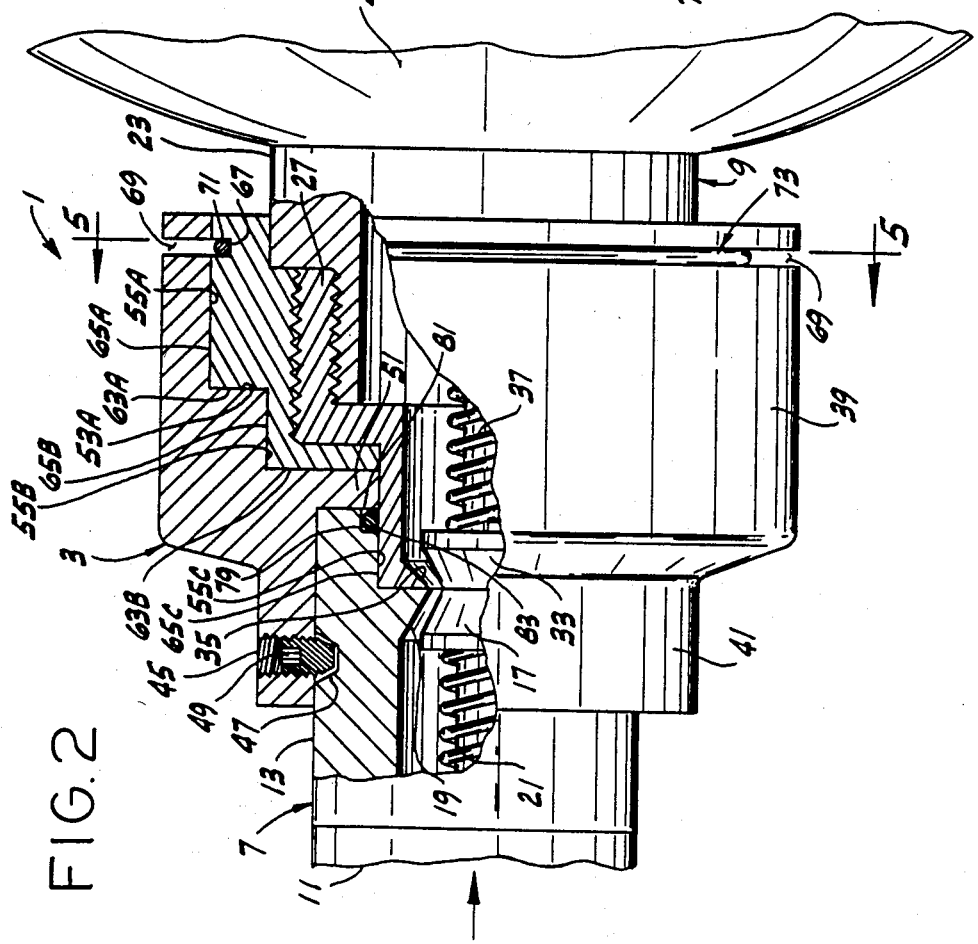
FIG. 2 is an enlarged view of the set of coupling members of FIG. 1 in interengagement with one another.

As illustrated, conduit 7 comprises a hose 11 having a valve component or fitting 13 at its downstream (right as viewed in FIG. 1) end. Valve component 13 has an axial passage 15 therethrough housing a valve member 17 movable in the passage between a closed position (FIG. 1) in which the nose of the valve member is in sealing engagement with a valve seat 19 to block flow through conduit 3, and an open position (FIG. 2) in which the valve member is spaced from the valve seat to permit flow through the passage. A spring 21 urges the valve member 17 toward its closed position. Conduit 9 comprises a first component 23 affixed to a tank 25, and a second valve component in the form of a nipple 27 threaded on the tank component 23. Components 23 and 27 have coaxial passages therethrough indicated at 29 and 31, respectively. Nipple 27 houses a valve member 33 movable in passage 31 between a closed position (FIG. 1) in which the valve member is in sealing engagement with a valve seat 35 to block flow through conduit 5, and an open position (FIG. 2) in which the valve member is spaced from the valve seat to permit the flow of fluid therepast. A spring 37 biases the valve member toward its closed position. The valve members 17, 33 are adapted to move to their open positions when conduits 7 and 9 are connected, as shown in FIG. 2, and to their closed positions when the conduits are disconnected, as shown in FIG. 1.

The outer anti-mismatch fitting 3 of set 1 has a generally cylindric body 39, an integral collar 41 at the upstream (left as viewed in FIG. 1) end of the body, and a central axial bore therethrough generally indicated at 43. It is detachably connected to valve component 13 at the downstream (right) end of the hose 11 by any suitable means which allows rapid and easy removal and cleaning of the component 13 and fitting 3. For example, the anti-mismatch fitting 3 may be attached to the valve component 13 by a set screw 45 threadable through collar 41 into a recess 47 in component 13. Set screw 45 preferably has a uniquely configured wrench socket 49 so that anti-mismatch fitting 3 may only be detached by someone having a special tool (not shown) adapted for the socket. Therefore, set screw 45 constitutes one means for securing the anti-mismatch fittings 3 of the system against unauthorized removal from respective fluid conduits. An internal radial flange 51 in bore 43 is adapted for face-to-face engagement with the downstream end of component 13 to limit insertion of the component within the bore.

The diameter of the bore 43 progressively decreases in the upstream direction to provide a stepped configuration forming a plurality of internal annular shoulders (e.g., shoulders 53A and 53B) and internal bore sections (e.g., sections 55A, 55B, and 55C). It will be understood that the number and size of these internal shoulders and internal bore sections may be varied without departing from the scope of this invention.

The inner anti-mismatch fitting 5 is generally cylindric in shape and has a central axial bore therethrough generally indicated at 57. The downstream (right as viewed in the drawings) end of bore 57 is threaded at 57A for engagement with a complementary threaded portion 59 of valve nipple 27, threaded on tank component 23. Other methods of connection are possible. For example, anti-mismatch fitting 5 may have a slip-fit on nipple 27 and be secured in place by a set screw similar to the set screw 45 of outer anti-mismatch fitting 3, or by a suitable latching mechanism.

The inner anti-mismatch fitting 5 has a cylindric outer surface generally designated 61, the diameter of which progressively increases in the downstream direction to provide a stepped configuration forming a plurality of external annular shoulders (e.g., shoulders 63A and 63B) and a plurality of outer cylindric surface sections (e.g., sections 65A, 65B and 65C). As shown in FIG. 2, the external shoulders 63A and 63B of the inner anti-mismatch fitting 9 are uniquely adapted for mating face-to-face with respective internal shoulders 53A and 53B of the outer anti-mismatch fitting 3 of the same set in a manner which permits the valve members 17 and 33 to open against the bias of springs 21 and 37 to permit flow through the conduits 7, 9.

It will be noted, however, that the configurations of the anti-mismatch fittings 3, 5 of other sets are different, the arrangement being such that the inner anti-mismatch fitting 5 of one set is not adapted to mate (fully interengage) with the outer anti-mismatch fittings 3 of other sets, the result being that the conduits 7 and 9 cannot be connected and the valve members opened unless the anti-mismatch fittings of the same set are used. By way of illustration, an outer anti-mismatch fitting 3A of a second set may be configured in the way shown in FIG. 3. It will be apparent that this fitting 3A will not mate with inner anti-mismatch fitting 5 of set 1.

Figure 3:
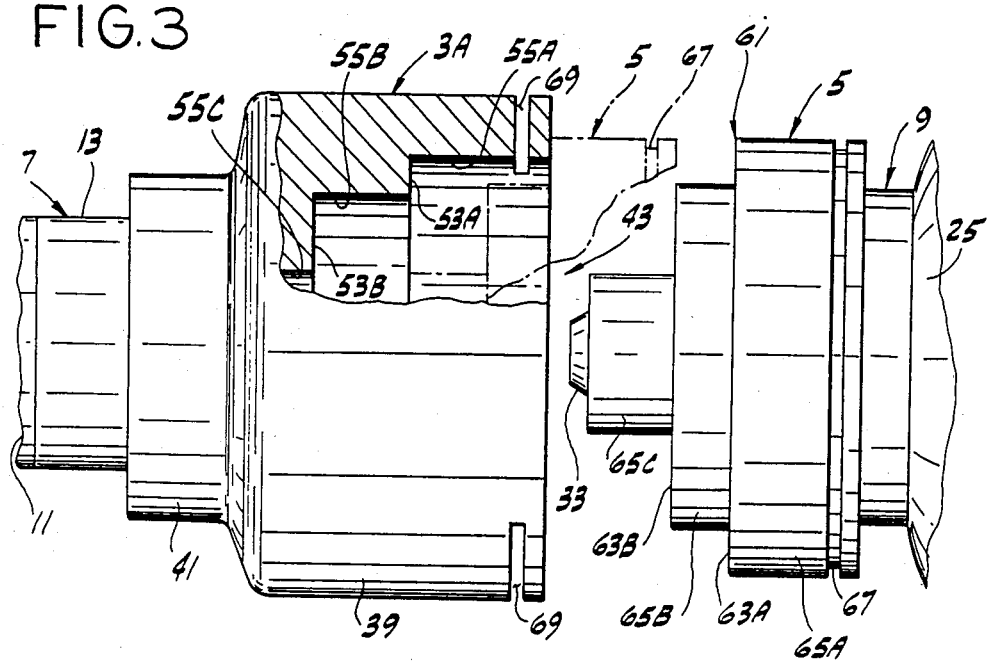
FIGS. 3 and 4 are views illustrating that coupling members of different sets are not interengageable.
Figure 4:
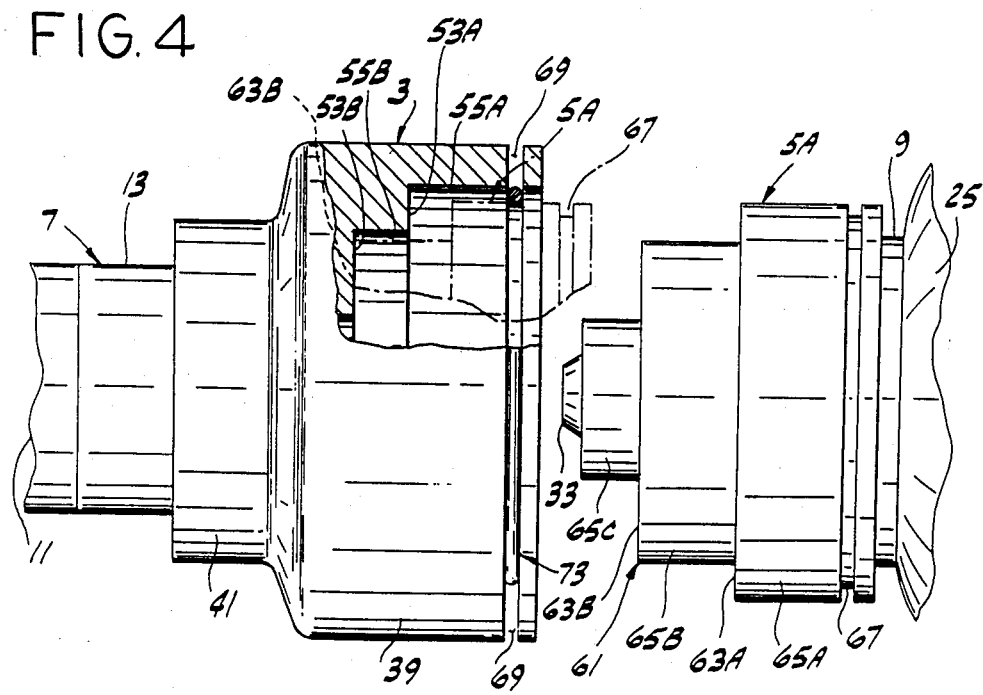

Stated another way, the configuration of the internal bore 43 through the outer anti-mismatch fitting 3 and the corresponding configuration of the outer surface 61 of the inner anti-mismatch fitting 5 are unique to each set, so that the mating surfaces (e.g., 53A–B, 55A–C, 63A–B, and 65A–C) of the anti-mismatch fittings of the same set mate only with one another (e.g., 53A to 63A, 55B to 65B, etc., as shown in FIG. 2) and not with corresponding mating surfaces of the anti-mismatch fittings of different sets. For example, another set of anti-mismatch fittings (3A, 5A) may have two corresponding internal and external shoulders sized to mate with each other but not with of the anti-mismatch fittings of the set shown in FIG. 1, as shown in FIGS. 3 and 4, or it may have five corresponding internal and external shoulders (not shown).

It will be apparent that the anti-mismatch fittings 3 and 5 may be configured in other ways to accomplish the same result, that is, a result wherein the anti-mismatch fittings of one set are configured for interengagement only with one another and not with anti-mismatch fittings of different sets. For example, anti-mismatch fittings having unique and irregular geometric shapes may be designed which would accomplish the stated result. In any design, however, it is important that the anti-mismatch fittings of each set are adapted (uniquely configured) for interengagement only with one another in a manner which connects two matching fluid conduits and permits fluid flow therethrough.

Preferably, the anti-mismatch fittings 3, 5 are rotatable relative to one another when in interengagement, thereby allowing the fluid conduits to unwind and relieve any torsional stress in the conduits. As shown in the drawings, this may be accomplished by providing bore sections 55A–C with circular cross-sections and the outer surface sections 65A–C with generally cylindric configurations.

The anti-mismatch fittings 3, 5 of each set are preferably color-coded (or otherwise marked) to distinguish them from the anti-mismatch fittings of other sets. For example, the anti-mismatch fittings of one set may be blue and anti-mismatch fittings of other sets may be of different colors.

Figure 5:
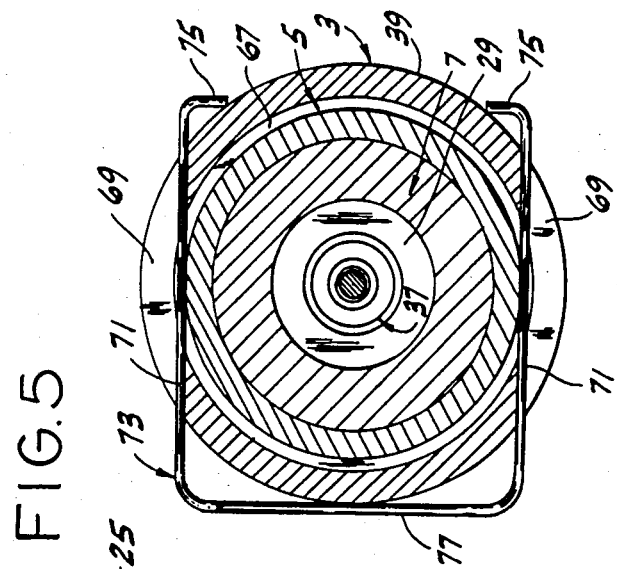
FIG. 5 is a cross sectional view taken along line 5—5 in FIG. 2.

Suitable means may be provided for releasably connecting the anti-mismatch fittings 3, 5 of each set and holding them in interengagement in a position in which the valve members 17 and 33 are held open by interengagement with one another. For example, outer surface section 65A of the inner anti-mismatch fitting 5 may have a latching groove 67 therein extending circumferentially of the member, and the outer anti-mismatch fitting 3 may have two slots 69 for receiving the legs 71 of a U-shaped latching spring 73, as shown in FIGS. 2 and 5. The arrangement is such that when the inner anti-mismatch fitting 5 is inserted into the bore 43 of the outer anti-mismatch fitting 3 to a position in which their mating surfaces (e.g. 53A–B, 55A–C, 63A–B, and 65A–C) engage, the latching spring 73 springs into the latching groove 67 (FIG. 2), thereby holding the anti-mismatch fittings together. Alternatively, latching spring 73 may be inserted into slots 69 and latching groove 67 while the anti-mismatch fittings are interengaged. As shown, the outer ends of the legs 71 of the spring are bent inwardly to form tabs 75 engageable with the outer cylindric surface of fitting 3. The arrangement is such that the anti-mismatch fittings 3, 5 may be disconnected by pulling the closed end 77 of the latching spring, which (by means of the engagement of tabs 75 with the cylindric surface of fitting 3) causes legs 71 to spread apart and out of latching groove 67. This design permits relative rotation between the outer and inner anti-mismatch fittings 3, 5 when they are connected, which is desirable to minimize torsion and twisting of the fluid conduits.

As shown in FIG. 4, the latching groove (shown in phantom) of anti-mismatch fitting 5A does not align with latching spring 73 of anti-mismatching fitting 3, and thus this means for detachably connecting the anti-mismatch fittings is also helpful for preventing accidental misconnection of anti-mismatch fittings of different sets.

As described herein, the anti-mismatch fittings 3, 5 incorporate means (latching spring 73 and latching groove 67) for connecting the conduits 7, 9. It will be understood, however, that the fittings 3,5 need not have a coupling function. For example, the conduits themselves may incorporate a latching mechanism independent of the anti-mismatch fittings, in which case the fittings would serve only to prevent mismatched conduits from being connected.

Referring to FIG. 2, conduit 7 has a counterbore 79 in the downstream end of valve component 13, which in conjunction with the internal flange 51 of the outer anti-mismatch fitting forms an internal annular groove 81. An O-ring seal 83 carried in this groove 81 is adapted for pressure engagement with the outer surface portion 65C of the inner anti-mismatch fitting when the anti-mismatch fittings are connected, thereby preventing leakage of fluid. It will be observed that when anti-mismatch fitting 3 is disconnected from component 13, the O-ring groove is readily accessible for cleaning and replacement of the O-ring, if necessary.

Anti-mismatch fittings 3, 5 are readily disconnected from conduits 7 and 9, respectively, when the conduits are disconnected. For example, anti-mismatch fitting 3 may be disconnected by unthreading set screw 45 from fitting 3, and anti-mismatch fitting 5 may be disconnected by unthreading it from valve component 27. Because the anti-mismatch fittings are separate from the valve components, it will be understood that the fittings may readily be removed (as for cleaning or for deliberately switching conduits) without loss of fluid via either conduit 7, 9, flow through the conduits being blocked by closed valve members 17 and 33.

It will be observed from the foregoing that the anti-mismatch system of the present invention ensures the proper connection of matching fluid conduits and eliminates the possibility of connecting mismatching fluid conduits. In addition, the anti-mismatch fittings may be deliberately connected to any fluid conduit but only anti-mismatch fittings of the same set may be interconnected. This facilitates changing fluid conduits and prevents inadvertent misconnection of non-matching fluid conduits. Moreover, in sharp contrast to the prior art anti-mismatch system referred to previously in this application, wherein the anti-mismatch components of each pair of anti-mismatch fittings are integrally formed with other components of the fittings, the anti-mismatch fittings 3, 5 of the present invention are readily separable from the other parts of the fittings (e.g., from valve components 13 and 27, respectively). This construction achieves a high degree of economy since conversion from one pair of anti-mismatch fittings to another requires only the replacement of the anti-mismatch components per se, and not the other component parts of the fittings, such as the valve components, pipe tubing, etc.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. For use in connecting a plurality of pairs of fluid conduits wherein each pair comprises matching first and second conduits comprising interengageable valve components at respective ends of the conduits, an anti-mismatch system for preventing the inadvertent connection of mismatched fluid conduits, said system comprising a plurality of sets of anti-mismatch fittings, each set including a first anti-match fitting formed for detachable connection with respect to the valve component of the first fluid conduit of each of said pairs of matching fluid conduits and a second anti-mismatch fitting formed for detachable connection with respect to the valve component of the second fluid conduit of each of said pairs of matching fluid conduits, the first and second anti-mismatch fittings of each set being formed to surround their respective conduit ends and being uniquely configured for interengagement only with one another and not with anti-mismatch fittings of different sets thereby to enable connection only of matching first and second fluid conduits.

2. An anti-mismatch system as set forth in claim 1 further comprising means for detachably connecting said first and second anti-mismatch fittings of each set thereby to couple respective matching first and second fluid conduits.

3. An anti-mismatch system as set forth in claim 2 further comprising means for securing said anti-mismatch fittings against unauthorized removal from said fluid conduits.

4. An anti-mismatch system as set forth in claim 2 wherein said first and second anti-mismatch fittings of each set comprise an outer anti-mismatch fitting having a central axial bore therethrough and an inner anti-mismatch fitting receivable in said bore of the outer fitting, said inner and outer anti-mismatch fittings having mating surfaces uniquely configured for mating only with one another and not with corresponding mating surfaces of the anti-mismatch fittings of different sets.

5. An anti-mismatch system as set forth in claim 4 wherein said first and second anti-mismatch fittings are rotatable relative to one another when in said interengagement, said means for detachably connecting said first and second anti-mismatch fittings of each set being adapted to permit relative rotation between said first and second fittings when said anti-mismatch fittings are connected.

6. An anti-mismatch system as set forth in claim 4 wherein the diameter of said axial bore through said outer anti-mismatch fitting progressively decreases in one direction to provide a stepped configuration forming a plurality of internal shoulders therein, said inner anti-mismatch fitting having an outer surface the diameter of which progressively increases in the opposite direction to provide a stepped configuration forming a plurality of external shoulders thereon adapted to mate face-to-face with the internal shoulders of the outer fitting.

7. An anti-mismatch system as set forth in claim 4 wherein said outer anti-mismatch fitting has an internal flange projecting radially inwardly into said central axial bore through the outer fitting, said internal flange being adapted for engagement with one end of a first fluid conduit when the outer fitting is connected to the conduit thereby to form an internal annular groove adapted to carry an O-ring seal therein, said groove being readily cleanable by detaching the outer anti-mismatch fitting from said first fluid conduit.

8. In combination with a plurality of pairs of fluid conduits, each pair comprising matching first and second conduits, each conduit having a fluid flow passage therethrough and a valve member movable in said passage between open and closed positions, an anti-mismatch system for preventing the inadvertent connection of mismatched fluid conduits, said anti-mismatch system comprising a plurality of sets of anti-mismatch fittings, each set including a first anti-mismatch fitting adapted for detachable connection to the first fluid conduit of each pair of matching fluid conduits and a second anti-mismatch fitting adapted for detachable connection to the second fluid conduit of each pair of matching fluid conduits, the first and second anti-mismatch fittings of each set being uniquely configured for interengagement only with one another and not with anti-mismatch fittings of different sets thereby to enable connection only of matching first and second fluid conduits, and means for detachably connecting the matching first and second fluid conduits of each set, said valve members of matching conduits being movable to their open positions when the conduits are connected and to their closed positions when the conduits are disconnected, said valve members of each pair of matching conduits being adapted to remain closed to block the flow of fluid through their respective fluid flow passages when the conduits are disconnected and the anti-mismatch fittings are detached from matching conduits.

9. A combination as set forth in claim 8 wherein each fluid conduit comprises a first component and a separate second component housing said valve member, said anti-mismatch fitting being adapted for detachable connection to said second component.

10. A combination as set forth in claim 9 wherein said second component of each fluid conduit housing said valve member is detachably connected to said first component.

11. A combination as set forth in claim 8 further comprising means for securing said anti-mismatch fittings against unauthorized removal from said fluid conduits.

12. A combination as set forth in claim 8 wherein said first and second anti-mismatch fittings of each set comprise an outer anti-mismatch fitting having a central axial bore therethrough and an inner anti-mismatch fitting receivable in said bore of the outer fitting, said inner and outer anti-mismatch fittings having mating surfaces uniquely configured for mating only with one another and not with corresponding mating surfaces of the anti-mismatch fittings of different sets.

13. A combination as set forth in claim 12 wherein said first and second anti-mismatch fittings are rotatable relative to one another when in said interengagement, said means for detachably connecting said first and second anti-mismatch fittings of each set being adapted to permit relative rotation between said first and second fittings when said anti-mismatch fittings are connected.

14. A combination as set forth in claim 12 wherein the diameter of said axial bore through said outer anti-mismatch fitting progressively decreases in one direction to provide a stepped configuration forming a plurality of internal shoulders therein, said inner anti-mismatch fitting having an outer surface the diameter of which progressively increases in the opposite direction to provide a stepped configuration forming a plurality of external shoulders thereon adapted to mate face-to-face with the internal shoulders of the outer fitting.

15. A combination as set forth in claim 12 wherein said outer anti-mismatch fitting has an internal flange projecting radially inwardly into said central axial bore through the outer fitting, said internal flange being adapted for engagement with one end of a first fluid conduit when the outer fitting is connected to the conduit thereby to form an internal annular groove adapted to carry an O-ring seal therein, said groove being readily cleanable by detaching the outer anti-mismatch fitting from said first fluid conduit.

16. A combination as set forth in claim 15 wherein said first fluid conduit has a counterbore in said one end thereof, the internal flange of the outer anti-mismatch fitting being adapted for face-to-face engagement with said one end of the fluid conduit for forming, in conjunction with said counterbore, said annular groove.

* * * * *

UNITED STATES PATENT AND TRADEMARK OFFICE
CERTIFICATE OF CORRECTION

PATENT NO. : 4,696,326

DATED : September 29, 1987

INVENTOR(S) : James L. Sturgis

It is certified that error appears in the above—identified patent and that said Letters Patent is hereby corrected as shown below:

Column 7, claim 1, line 21, "anti-match" should read --anti-mismatch--. Column 8, claim 8, line 35, after "their" and before "closed positions" insert --open positions when the conduits are connected and to their--.

Signed and Sealed this

First Day of November, 1988

Attest:

DONALD J. QUIGG

Attesting Officer

Commissioner of Patents and Trademarks